United States Patent Office  3,434,914
Patented Mar. 25, 1969

3,434,914
GLASS FIBER REINFORCED THERMOPLASTIC POLYARYLENE POLYETHER RESIN ARTICLE AND PROCESS FOR MAKING SAME
Samuel Sterman, Williamsville, and James G. Marsden, Tonawanda, N.Y., assignors to Union Carbide Corporation, a corporation of New York
No Drawing. Filed Feb. 1, 1966, Ser. No. 523,917
Int. Cl. B32b 17/04; B29d 7/14
U.S. Cl. 161—93                                6 Claims This invention is directed to glass-reinforced resins of polyarylene polyethers.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and non-dripping, and are inert to both mineral acid and caustic. More importantly, they retain their superior thermal properties at elevated temperatures, thus surpassing the elevated temperature capabilities of prior melt fabricable thermoplastic materials.

Notwithstanding the desirable physical properties of the aforementioned resins, and additional improvement thereof can be achieved by reinforcing these resins with strengthening materials such as glass in fibrous form, for example.

It has now been found that a further improvement in the physical properties of glass-reinforced polyarylene polyether resins can be achieved by treating the fibrous glass, prior to its incorporation within the resin, with certain chemical compounds. Accordingly, it is the principal object of this invention to provide as a material of construction a polyarylene polyether resin reinforced by fibrous glass and exhibiting materially enhanced physical properties while retaining its thermoplastic properties.

A further object of this invention is to provide a method for enhancing the physical properties of the aforementioned resins.

Still other objects will become apparent to one skilled in the art upon reference to the ensuing specification and the claims.

The objects of this invention are achieved by an article of manufacture which is a thermoplastic composite of fibrous glass, a polyarylene polyether resin and an aminoalkyltrialkoxy silane which can be N,N-bis-(hydroxyalkyl)aminoalkyltrialkoxysilane, a glycerol-modified aminoalkyltrialkoxysilane, or corresponding hydrolyzate of the foregoing.

The above article of manufacture, possessing the enhanced physical properties, can be prepared by (1) providing a fibrous glass substrate, (2) treating this substrate with the aforementioned aminoalkyltrialkoxysilane, (3) intimately contacting the treated glass substrate with the polyarylene polyether resin, and (4) thermoforming the resulting composite at a temperature below the decomposition temperature of the resin and the silane.

Thermoplastic polyarylene polyethers contemplated in the present invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they can be conveniently prepared by the reaction of an alkali metal double salt of a dihydric phenol and a dihalo-benzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4 - hydroxyphenyl) - 2 - phenylethane, bis-(4-hydroxyphenyl)methane, or the chlorinated derivatives containing one or two chlorines on each aromatic ring. Other suitable dinuclear dihydric phenols are the bis-phenols of a symmetrical or unsymmetrical joining group as, for example, either oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

$$\text{HO}(\overset{(Y)_r}{\underset{|}{Ar}}-R-\overset{(Y_1)_z}{\underset{|}{Ar}})\text{OH}$$

wherein Ar is an aromatic group and preferably is a phenylene group, Y and $Y_1$ can be the same or different inert substituent groups as alkyl groups having from 1 to 4 carbon atoms, halogen atoms, i.e., fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4′-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane, 2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl),1,1,1,3,3,3-hexafluoropropane
and the like;
Di(hydroxyphenyl)sulfones such as bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like.
Di(hyroxyphenyl)ethers such as bis-(4-hydroxyphenyl)ether, the 4,3'-, 4,2'-, 2,2'-, 2,3'- dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus, when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoil compounds, fluorine and chlorine substituted benzenoid reactants being preferred.

Any electron withdrawing group can be employed as the activator group in the dihalobenzenoid compound. Preferred are the strong activating groups such as the sulfone group (—SO₂—) bonding two halogen substituted benzenoid nuceli as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compond can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e., above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) groups which can activate displacement of halogens on two different rings, such as the sulfone group —SO₂—; the carbonyl group —CO—; the vinyl group —CH=CH—; the sulfoxide group —SO—; the azo group —N=N—; the saturated fluorocarbon groups

—CF₂—CF₂— organic phosphine oxides

where R is a hydrocarbon group, and the ethylidene group

where X can be hydrogen or halogen or which can activate halogen on the same ring such as with difluorobenzoquinone, 1,4- or 1,5- or 1,8-difluoroanthraquinone.

If desired, the polymers may be male with mixtures of two or more dihalobenzenoid compounds each of which has this structure, and which may have different electron withdrawin roups. Thus the E' residuum of the benzenoid compounds in the polymer strcture may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric and E¹ is the residuum of a dinuclear benzenoid compound. These preferred polymers then are composed of recurring units having the formula

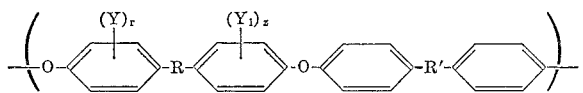

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y₁ each represent inert substitutent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

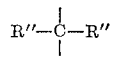

wherein R" represents a member of the group consisting of hydrogen, lower alkyl, lower aryl, and the halogent substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salts of the dihydric phenol can be used as the one reactant.

The specific solvents employed have the formula R—S(O)$_z$—R wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene, 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reaction described herein substantially anhydrous conditions are maintained before and during the reaction. While amounts of water up to about one percent can be tolerated, amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as co-solvents for the polymer during polymerization. Chlorobenzene dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The co-solvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C. are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4.

The crux of the present invention lies in the selection of the proper aminoalkyltrialkoxysilane for the treatment of the fibrous glass employed for reinforcement of the resin. This selection must be carried out with great care since an improvident choice will work to the detriment of the physical properties of the ultimate article. Furthermore, considerable research into the reaction mechanisms involved has failed to cast sufficient light on the observed phenomena to enable the skilled artisan to make a reliable prediction of the performance of a particular aminoalkyltrialkoxysilane in the selected resin system even on the basis of observed performance of silanes having closely related organofunctional groups.

The following groupings of aminoalkyltrialkoxysilanes have been found to materially enhance the physical properties of a polyarylene polyether resin reinforced by fibrous glass: (a) a N,N-bis-(hydroxyalkyl)aminoalkyltrialkoxysilane such as N,N-bis-(beta-hydroxyethyl)-gamma-aminopropyltriethoxysilane, N,N-bis-(beta-hydroxyethyl)-gamma-aminopropyltrimethoxysilane, N,N - bis-(gamma-hydroxypropyl) - delta - aminobutyltriethoxysilane, N,N-bis - (beta - hydroxyethyl) - beta - aminoethyltriethoxysilane, and the like; and (b) a glycerol-modified aminoalkyltrialkoxysilane exemplified by gamma-aminopropyltriethoxysilane, beta - aminoethyltriethoxysilane, beta-aminobutyltriethoxysilane, gamma - aminobutyltrimethoxysilane, and the like.

The glycerol-modified aminoalkyltrialkoxysilane can be prepared by admixing glycerol with the silane, such as gamma-aminopropyltriethoxysilane, for example. Illustrative typical procedure is described below.

The particular method of mixing is not narrowly critical and the mixtures can be prepared by either adding glycerol to gamma-aminopropyltriethoxysilane using mild agitation or, alternatively, the gamma-aminopropyltriethoxysilane can be added to the glycerol. The composition can also be prepared by adding glycerol to a dilute solution of the gamma-aminopropyltriethoxysilane in a suitable solvent. The addition and agitation is conducted at room temperature; however, the temperature of the mixture increases due to an exothermic reaction. For example, in an experiment wherein the total weight of the mixture was six pounds, the temperature increased from 25° C. to about 60° C. Without wishing to be bound by any one particular theory as to the chemical characterization of the resulting product formed upon the admixture of these materials, it is believed that the product is a complex mixture of the gamma - aminopropyltriethoxysilane-glycerol silane esters, ethanol, and possibly some hydrolyzates of the silane monomers. One reaction that probably takes place may be schematically illustrated by the following equation:

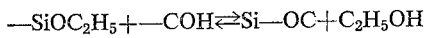

Any ethanol that may be formed is not removed from the system, and a condition of equilibrium is probably reached at which the final composition contains a complex mixture of both the starting materials and the transesterification products.

The ratio of the amount by weight of glycerol to the aminoalkyltrialkoxysilane can vary from about 10 parts of glycerol to 1 part of the aminoalkyltrialkoxysilane to about 1 part of glycerol to 1 part of the aminoalkyltrialkoxysilane. The latter ratio is preferred for obtaining the best physical properties in laminates prepared from glass cloth treated with the glycerol-modified aminoalkyltrialkoxysilane.

In order to be suitable for the purposes of the present invention the glass substrate must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized with the aminoalkyltrialkoxysilane in any convenient manner. The silane can be applied to the glass fibers at the extrusion bushing as the glass fibers are produced, or the sizing can be carried out by means of an aqueous solution of the proper silane into which the glass fibers are dipped and subsequently dried. In the latter case the silane is deposited on the glass fiber as the corresponding hydrolyzate.

It will be apparent to one skilled in the art that the materials actually deposited on the fibrous glass from aqueous solutions are the silane derived hydrolyzates rather than the silanes as such. The hydrolyzates are siloxanes, e.g., an aqueous solution of N,N - bis-(beta-hydroxyethyl) - gamma - aminopropyltriethoxysilane deposits on the glass fibers as N,N - bis - (beta-hydroxyethyl)-gamma-aminopropylsiloxane.

The silane loading on the glass fibers must be sufficient to enhance the flexural strength of the ultimate thermoformed article. While for practical applications the loading is usually expressed in terms of weight percent, based on the weight of the treated glass fibers, it must be recognized that the minimum loading requirement may vary depending on the surface area of the particular glass fibers that are employed. When fibrous glass having a surface area of from about 0.1 to about 0.2 square meter per gram is employed, the effective silane loading can range from about 0.01 to about 5 weight percent, based on the weight of the treated fiber. Preferably the silane loading is in the range from about 0.1 to about 0.75 weight percent.

The silane-treated glass and the polyarylene polyether resin can be brought in intimate contact with each other in any convenient manner and then thermoformed. The term "thermoforming," as used herein and in the appended claims, is taken to mean the transformation of the resin-silane-glass composite into useful shapes by means of heat and/or pressure. Illustrative thermoforming processes are molding, extrusion, hot calendering, casting, vacuum forming, and the like.

A method of achieving intimate contact between the treated fibrous glass and the polyarylene polyether resin is illustrated by the examples below. Still other methods include the utilization of resin film or sheet and the preparation therefrom of a dry laminate having alternating plies of fibrous glass and resin which is then molded, the admixture of chopped, silane-treated glass fibers with warm or hot, fluid resin in a mechanical mixer prior to extrusion, the calendering of the resin onto a treated glass cloth or mat, and the like.

The example below further illustrates the present invention. Glass reinforcement in the form of woven glass fabric was used in all examples. The fabric was a satin weave cloth having a thickness of 10 mils, weighing about 8.9 ounces per square yard, having 57×54 ends and picks per square inch and having a breaking strength of 375×350 pounds per square inch. The fabric had the weaving size burned off in a heat cleaning operation. The control in all instances comprised resin reinforcement with cloth having had no silane treatment.

The thermoplastic polyarylene polyether resin employed in these examples was polysulfone resin having as the recurring unit

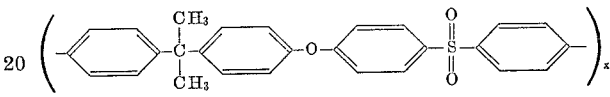

and being in the form of a 8 mil film.

Example

An aqueous treating bath was prepared by dissolving about one weight percent of a desired silane in water. A clear, colorless solution resulted. Six-inch strips of the aforementioned woven glass fabric were passed through this solution, dried at room temperature, and then placed in an oven for about two and one-half minutes at about 135° C. (275° F.) The glass fabric was observed to pick up about one-half of its weight of the solution. After evaporation of the solvent there remained, based on the weight of the fabric, a coating of the fabric equivalent to about 0.5 weight percent of the silane.

Eleven pieces, six inches by six inches, were cut from the resulting, silane-treated glass fabric and twelve pieces of the same size were cut from the polysulfone film. A dry laminate was then prepared having alternating plies of the film and the glass cloth.

The dry laminate was placed in a press preheated to about 316° C. (600° F.) and pressed to 0.125 inch stops for about 30 minutes, the press cooled, and the laminate removed. This operation produced a composite having a thickness of about 0.125 inch and a polysulfone resin content of about 40±2 weight percent.

A second composite was prepared in a similar manner except the heat cleaned fabric used as reinforcement was not subjected to the silane treatment.

Flexual strength test specimens of approximately 4″ x ½″ x ⅛″ were cut from both types of the above composites, and the flexural strength determined according to ASTM Method D–790–61. A portion of the specimens was tested at room temperature and another portion was tested at room temperature but after immersion for about 6 hours in water at about 49° C. (120° F). The flexural strengths observed are given in the table below.

TABLE

| Silane [1] | Flexural strength (p.s.i.×10⁻³) | |
|---|---|---|
| | Room temp. | Wet [2] |
| Control | 69.0 | 29.1 |
| N,N-bis-(beta-hydroxyethyl)-gama-aminopropyltriethoxysilane | 85.3 | 81.0 |
| Glycerol-modified gamma-aminopropyltriethoxysilane [3] | 80.4 | 73.9 |
| Gamma-aminopropyltriethoxysilane | 46.4 | 42.8 |

[1] Silanes were applied at a loading of 0.5 wt. percent based on the weight of glass cloth.
[2] Samples immersed for 16 hours in water at about 49° C. (120° F.) and tested at room temperature.
[3] Weight ratio of about 1:1.

The above data clearly indicate the improvement in flexural strength obtained by the practice of the present invention. The data further show that whereas glycerol-modified aminoalkyltrialkoxysilane enhances flexural strength at room temperature, the unmodified version of the same compound actually decreases it.

We claim:

1. A method for reinforcing thermoplastic polyarylene polyether resin which comprises (1) providing a fibrous glass substrate, (2) treating the glass substrate with an aminoalkyltrialkoxysilane which is a member of the group consisting of a N,N-bis-(hydroxyalkyl)aminoalkyltrialkoxysilane and a glycerol-modified aminoalkytrialkoxysilane, or a hydrolyzate thereof, (3) intimately contacting the treated glass substrate with the polyarylene polyether resin, and (4) thermoforming the resulting composite at a temperature below the decomposition temperature of the resin and the silane; the amount of silane; the amount of silane deposited on the glass fiber being sufficient to enhance the flexural strength of the thermoformed composite.

2. The method in accordance with claim 1 wherein the aminoalkytrialkoxysilane is N,N-bis-(beta-hydroxyethyl)-gamma-aminopropyltriethoxysilane or the corresponding hydrolyzate thereof.

3. The method in accordance with claim 1 wherein the aminoalkyltrialkoxysilane is glycerol-modified gamma-aminopropyltriethoxysilane of the corresponding hydrolyzate thereof.

4. An article of manufacture which is a thermoplastic composite of fibrous glass, a polyarylene polyether resin, and an aminoalkyltrialkoxysilane selected from the group consisting of a N,N-bis-(hydroxyalkyl)aminoalkyltrialkoxysilane and glycerol-modified aminoalkyltrialkoxysilane, or a hydrolyzate thereof.

5. An article of manufacture in accordance with claim 4 wherein the aminoalkyltrialkoxysilane is N,N-bis-(beta-hydroxyethyl)-gamma-aminopropyltriethoxysilane or the corresponding hydrolyzate thereof.

6. An article of manufacture in accordance with claim 4 wherein the aminoalkyltrialkoxysilane is glycerol-modified gamma-aminopropyltriethoxysilane or the corresponding hydrolyzate thereof.

References Cited

UNITED STATES PATENTS

| 3,249,412 | 5/1966 | Kolek et al. | 161—185 |
| 3,307,967 | 3/1967 | Vanderbilt et al. | 117—126 |
| 3,375,297 | 3/1968 | Barth et al. | 161—186 |

ROBERT F. BURNETT, *Primary Examiner.*

WILLIAM J. VAN BALEN, *Assistant Examiner.*

U.S. Cl. X.R.

117—126, 76; 161—193; 264—90, 175